United States Patent
Miller et al.

(10) Patent No.: US 9,849,786 B2
(45) Date of Patent: Dec. 26, 2017

(54) VEHICLE SYSTEM AND METHOD FOR ADJUSTING DECELERATION RATE

(71) Applicant: FORD GLOBAL TECHNOLOGIES, LLC, Dearborn, MI (US)

(72) Inventors: Kenneth James Miller, Canton, MI (US); Douglas Raymond Martin, Canton, MI (US); William Paul Perkins, Dearborn, MI (US); Derek Hartl, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 14/474,802

(22) Filed: Sep. 2, 2014

(65) Prior Publication Data
US 2016/0059703 A1    Mar. 3, 2016

(51) Int. Cl.
| | | |
|---|---|---|
| *B60W 30/00* | (2006.01) | |
| *B60W 10/00* | (2006.01) | |
| *B60L 11/00* | (2006.01) | |
| *B60L 3/00* | (2006.01) | |

(52) U.S. Cl.
CPC ......... *B60L 3/0015* (2013.01); *Y02T 10/7275* (2013.01); *Y02T 90/14* (2013.01)

(58) Field of Classification Search
CPC ............ B60W 30/162; B60W 10/196; B60W 10/184; B60W 2600/00; Y10S 903/93; Y10S 903/947
See application file for complete search history.

(56) References Cited

U.S. PATENT DOCUMENTS

| | | | | |
|---|---|---|---|---|
| 5,572,428 A | * | 11/1996 | Ishida | B60K 31/0008 180/169 |
| 5,915,801 A | * | 6/1999 | Taga | B60K 6/48 303/152 |
| 6,459,980 B1 | | 10/2002 | Tabata et al. | |
| 6,782,961 B1 | * | 8/2004 | Ishikawa | B60K 28/16 180/197 |
| 7,559,387 B2 | * | 7/2009 | Tamai | B60K 6/485 180/65.21 |
| 8,055,422 B2 | | 11/2011 | Yurgil | |
| 8,256,549 B2 | | 9/2012 | Crain et al. | |
| 8,467,923 B2 | | 6/2013 | Fedewa | |
| 8,694,190 B2 | * | 4/2014 | Sawayama | B60L 7/14 180/65.21 |
| 2003/0201878 A1 | * | 10/2003 | Bai | G01S 13/931 340/435 |
| 2009/0240413 A1 | * | 9/2009 | Miyajima | B60W 50/0098 701/70 |
| 2010/0204863 A1 | * | 8/2010 | Sakamoto | B60K 6/445 701/22 |
| 2012/0139328 A1 | | 6/2012 | Brown et al. | |
| 2012/0173057 A1 | * | 7/2012 | Books | B60W 50/14 701/22 |
| 2013/0204501 A1 | | 8/2013 | Kenney et al. | |

(Continued)

FOREIGN PATENT DOCUMENTS

DE    102011017260 A1    10/2012

*Primary Examiner* — Yonel Beaulieu
(74) *Attorney, Agent, or Firm* — Carlson, Gaskey & Olds (57) ABSTRACT

A method according to an exemplary aspect of the present disclosure includes, among other things, controlling an electrified vehicle by adjusting a deceleration rate based on a closing rate of the electrified vehicle to an oncoming object.

22 Claims, 4 Drawing Sheets

(56) References Cited

U.S. PATENT DOCUMENTS

2014/0277989 A1* 9/2014 Krueger .............. B60W 10/184
                                                  701/96
2014/0372012 A1* 12/2014 Darnell ................ B60W 50/10
                                                  701/110

* cited by examiner

VEHICLE SYSTEM AND METHOD FOR ADJUSTING DECELERATION RATE

TECHNICAL FIELD

This disclosure relates to a vehicle system and method associated with an electrified vehicle. The vehicle system is configured to modify a deceleration rate of an electrified vehicle based on a closing rate of the vehicle relative to an oncoming object.

BACKGROUND

The need to reduce fuel consumption and emissions in automobiles and other vehicles is well known. Therefore, vehicles are being developed that reduce or completely eliminate reliance on internal combustion engines. Electrified vehicles are one type of vehicle currently being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

It is known to use an electric machine to decelerate an electrified vehicle. This is commonly referred to as regenerative braking. Regenerative braking can be achieved during braking or lift pedal conditions by configuring the electric machine as a generator. The act of generating power with the electric machine creates a negative braking torque, or regenerative torque, on the electric machine. The negative torque is transmitted to the drive wheels to slow the electrified vehicle.

An accelerator pedal can be calibrated to provide either more deceleration/regeneration or less deceleration/regeneration during lift pedal conditions. However, the ideal deceleration rate may change depending on specific driving events. For example, if a customer tips out (i.e., lifts foot off of accelerator pedal) when an oncoming object is relatively far away, the vehicle may slow too quickly requiring the driver to tip in (i.e., apply pressure to the accelerator pedal) to reach the oncoming object. Conversely, if the operator tips out when the object is relatively close, the vehicle may coast too much requiring the driver to apply the brakes to stop the vehicle.

SUMMARY

A method according to an exemplary aspect of the present disclosure includes, among other things, controlling an electrified vehicle by adjusting a deceleration rate based on a closing rate of the electrified vehicle to an oncoming object.

In a further non-limiting embodiment of the foregoing method, the closing rate is based on a distance and a closing velocity from the electrified vehicle to the oncoming object.

In a further non-limiting embodiment of either of the foregoing methods, the closing velocity is based on a first velocity of the electrified vehicle and a second velocity of the oncoming object.

In a further non-limiting embodiment of any of the foregoing methods, the controlling step includes detecting the oncoming object and determining the closing rate to the oncoming object.

In a further non-limiting embodiment of any of the foregoing methods, the method includes calculating a desired deceleration rate from the closing rate.

In a further non-limiting embodiment of any of the foregoing methods, the method includes determining a negative torque demand necessary to achieve the desired deceleration rate.

In a further non-limiting embodiment of any of the foregoing methods, the method includes modifying a torque demand associated with a predefined accelerator pedal position to be equal to the negative torque demand that is necessary to achieve the desired deceleration rate.

In a further non-limiting embodiment of any of the foregoing methods, the method includes applying the negative torque demand to an electric machine to decelerate the electrified vehicle at the desired deceleration rate.

In a further non-limiting embodiment of any of the foregoing methods, the controlling step includes correlating a desired deceleration rate to a negative torque demand and applying the negative torque demand to an electric machine of the electrified vehicle to decelerate the electrified vehicle using regenerative braking.

In a further non-limiting embodiment of any of the foregoing methods, the controlling step includes adjusting the deceleration rate without applying brakes of the electrified vehicle.

A method according to another exemplary aspect of the present disclosure includes, among other things, determining a desired deceleration rate of an electrified vehicle to an oncoming object and modifying a negative torque demand associated with a predefined accelerator pedal position to achieve the desired deceleration rate to the oncoming object.

In a further non-limiting embodiment of the foregoing method, the method includes applying the negative torque demand to an electric machine of the electrified vehicle to decelerate the vehicle using regenerative braking.

In a further non-limiting embodiment of either of the foregoing methods, the method includes detecting the oncoming object prior to the determining step.

In a further non-limiting embodiment of any of the foregoing methods, the modifying step includes changing the negative torque demand on an accelerator pedal map to less negative, or zero, for a predefined accelerator pedal position if the oncoming object is relatively far or changing the negative torque demand of the accelerator pedal map to more negative for the predefined accelerator pedal position if the oncoming object is relatively near.

In a further non-limiting embodiment of any of the foregoing methods, the predefined accelerator pedal position is between a 0% pedal position and a pedal position that corresponds to zero torque demand or zero acceleration.

A vehicle system according to another exemplary aspect of the present disclosure includes, among other things, an accelerator pedal and a control module in communication with the accelerator pedal and configured to modify a deceleration rate of a vehicle by adjusting a negative torque demand associated with a predefined position of the accelerator pedal.

In a further non-limiting embodiment of the foregoing vehicle system, an object detection subsystem detects an oncoming object ahead of the vehicle.

In a further non-limiting embodiment of either of the foregoing vehicle systems, the accelerator pedal includes a sensor that detects a position of the accelerator pedal.

In a further non-limiting embodiment of any of the foregoing vehicle systems, the system includes an electric machine. The control module commands application of the negative torque demand to the electric machine to decelerate the vehicle.

In a further non-limiting embodiment of any of the foregoing vehicle systems, the deceleration rate is based on a closing rate to an oncoming object.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle system and method for adjusting a deceleration rate of an electrified vehicle during specific driving events. A closing rate of the electrified vehicle to an oncoming object may be determined based on a distance and a closing velocity to the oncoming object. A negative torque demand, or regenerative torque, required to achieve a desired deceleration rate may be determined from the desired deceleration rate, which can be calculated using the closing rate. During various driving events, the negative torque demand associated with a predefined accelerator pedal position may be increased or decreased to achieve a smooth, linear deceleration to the oncoming object without the need to apply the brakes of the vehicle. These and other features are discussed in greater detail in the paragraphs that follow.

Figure 1:
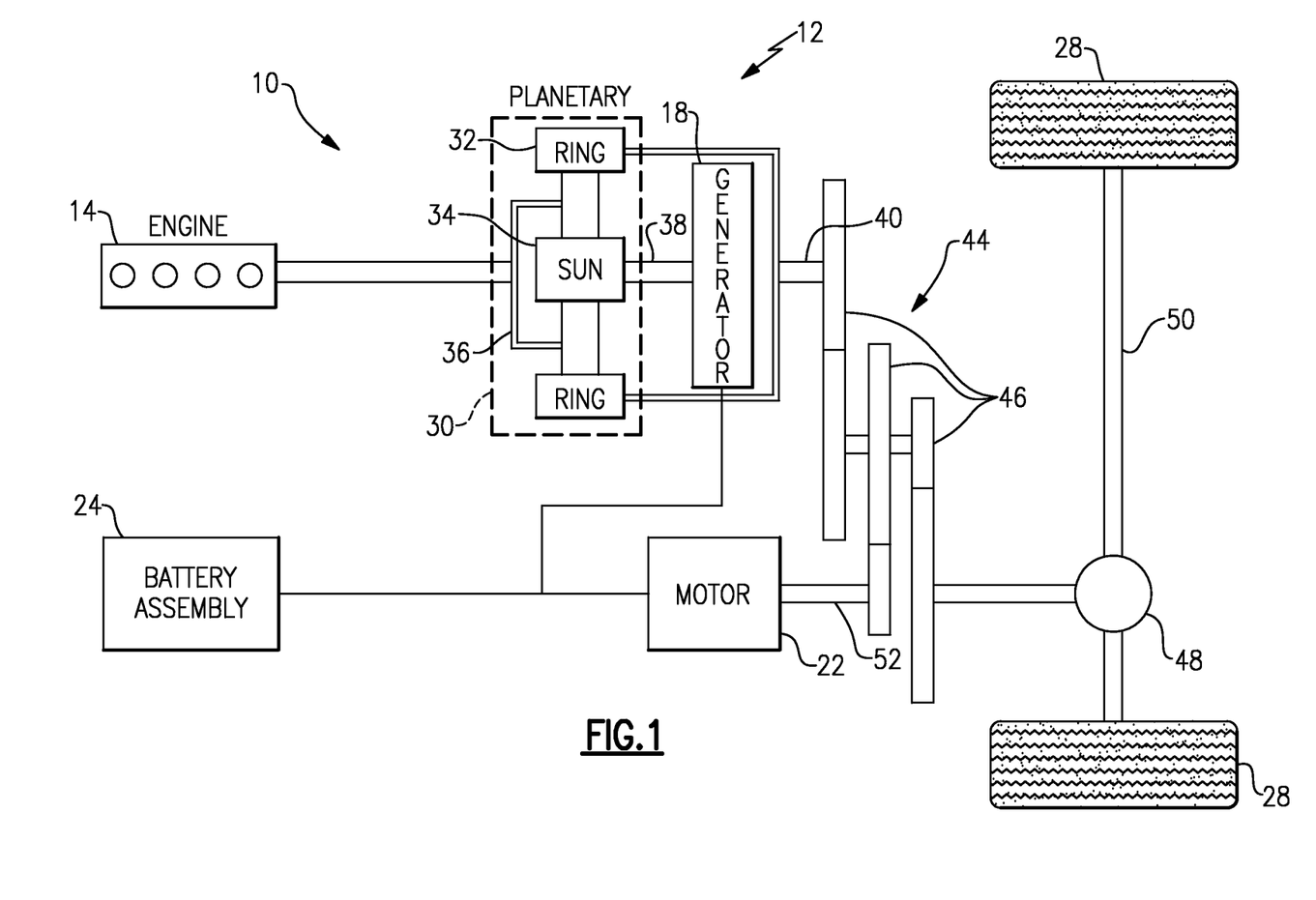
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and modular hybrid transmission vehicles (MHT's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which could include an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary type of electrified vehicle battery assembly. The battery assembly 24 may include a high voltage battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
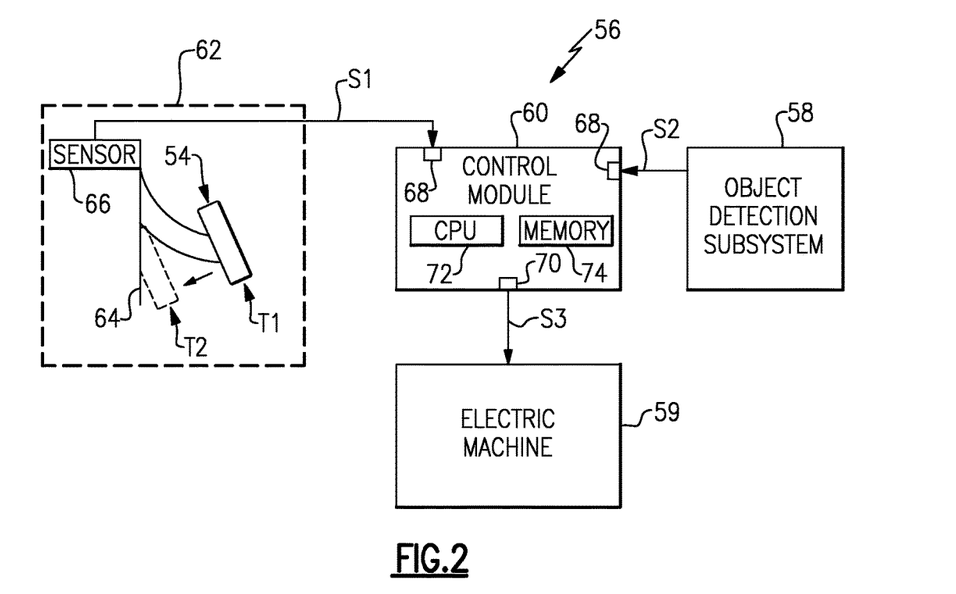
FIG. 2 illustrates a vehicle system that can be employed to adjust a deceleration rate of an electrified vehicle.

FIG. 2 illustrates a vehicle system 56 that may be incorporated into a vehicle, such as the electrified vehicle 12 of FIG. 1. The vehicle system 56 is adapted to adjust a deceleration rate of an electrified vehicle during various driving conditions, such as lift pedal conditions, as is further discussed below. In one non-limiting embodiment, the exemplary vehicle system 56 includes an accelerator pedal 54, an object detection subsystem 58, an electric machine 59, and a control module 60.

The accelerator pedal 54 may be located within a passenger compartment 62 (shown schematically) onboard an electrified vehicle. The accelerator pedal 54 may be actuated by a driver to request a torque, power or drive command for propelling or decelerating the vehicle. The accelerator pedal 54 may be positioned at a plurality of accelerator pedal positions between fully tipped out (shown as position T1, also called lift pedal) and tip in (shown as position T2). For example, at a 0% pedal position, the accelerator pedal 54 is completely tipped out (i.e., driver's foot has been removed from the accelerator pedal 54), and at a 100% pedal position the accelerator pedal 54 is completely tipped in (i.e., driver's foot has depressed the accelerator pedal 54 down to a floor board 64 of the passenger compartment 62).

The accelerator pedal 54 may an electronic device that includes a sensor 66 for indicating the accelerator pedal position during vehicle operation. In general, the sensor 66 may generate a pedal position signal S1 that is communicated to the control module 60 as the accelerator pedal 54 is depressed and/or released.

Figure 3:
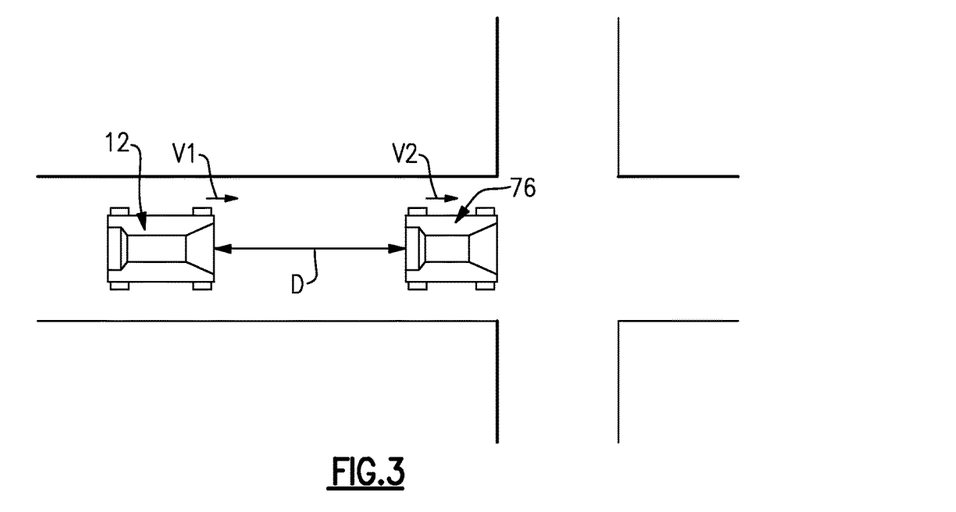
FIG. 3 schematically depicts an electric vehicle traveling toward an oncoming object.

The object detection subsystem 58 may be equipped to detect an oncoming object 76 (see FIG. 3). In one non-limiting embodiment, the object detection subsystem 58 utilizes GPS technology to detect the oncoming object 76. The object detection subsystem 58 could alternatively or additionally utilize radar, ladar, cameras and/or vehicle-to-vehicle communication technologies to detect the oncoming object 76. Stated another way, the object detection subsystem 58 may utilize any known technology, or combinations of technologies, to detect the existence of the oncoming object 76.

Referring to FIGS. 2 and 3, the object detection subsystem 58 may determine a closing rate to the oncoming object 76 once the oncoming object 76 has been detected. The oncoming object 76 may include another vehicle, a stop sign, a stop light or any other object ahead of the electrified vehicle 12. In one embodiment, the closing rate is based on at least a distance D from the electrified vehicle 12 to the oncoming object 76, and a closing velocity of the electrified vehicle 12 to the oncoming object 76. The closing velocity may be based on a velocity V1 of the electrified vehicle 12 and a velocity V2, if any, of the oncoming object 76. A closing rate signal S2 indicative of the closing rate may be communicated to the control module 60 from the object detection subsystem 58.

The electric machine 59 may be configured as an electric motor, a generator or a combined electric motor/generator. Based at least upon input from the accelerator pedal 54 via the pedal position signal S1, the control module 60 may command torque (either positive torque or negative torque) from the electric machine 59. For example, the electric machine 59 may receive torque command signals S3 from the control module 60 for propelling the electrified vehicle 12 or for decelerating the electrified vehicle 12 during periods of regenerative braking.

While schematically illustrated as a single module in the illustrated embodiment, the control module 60 of the vehicle system 56 may be part of a larger control system and may be controlled by various other controllers throughout an electrified vehicle, such as a vehicle system controller (VSC) that includes a powertrain control unit, a transmission control unit, an engine control unit, a battery electronic control module (BECM), etc. It should therefore be understood that the control module 60 and one or more other controllers can be collectively referred to as "a control module" that controls, such as through a plurality of integrated algorithms, various actuators in response to signals from various sensors to control functions associated with the electrified vehicle 12, and in this case, with the vehicle system 56. The various controllers that make up the VSC can communicate with one another using a common bus protocol (e.g., CAN).

In one embodiment, the control module 60 includes executable instructions for interfacing with and operating various components of the vehicle system 56. The control module 60 may include inputs 68 and outputs 70 for interfacing with the components of the vehicle system 56. The control module 60 may additionally include a central processing unit 72 and non-transitory memory 74 for executing the various control strategies and modes of the vehicle system 56.

In one embodiment, the control module 60 is configured to determine a deceleration rate for achieving a smooth, linear deceleration of the electrified vehicle 12 to the oncoming object 76. A desired deceleration rate may be calculated during various driving conditions based at least on the pedal position signal S1 and the closing rate signal S2. The control module 60 may communicate a torque command signal S3 to the electric machine 59 to achieve a desired deceleration rate during specific driving events.

Figure 4:
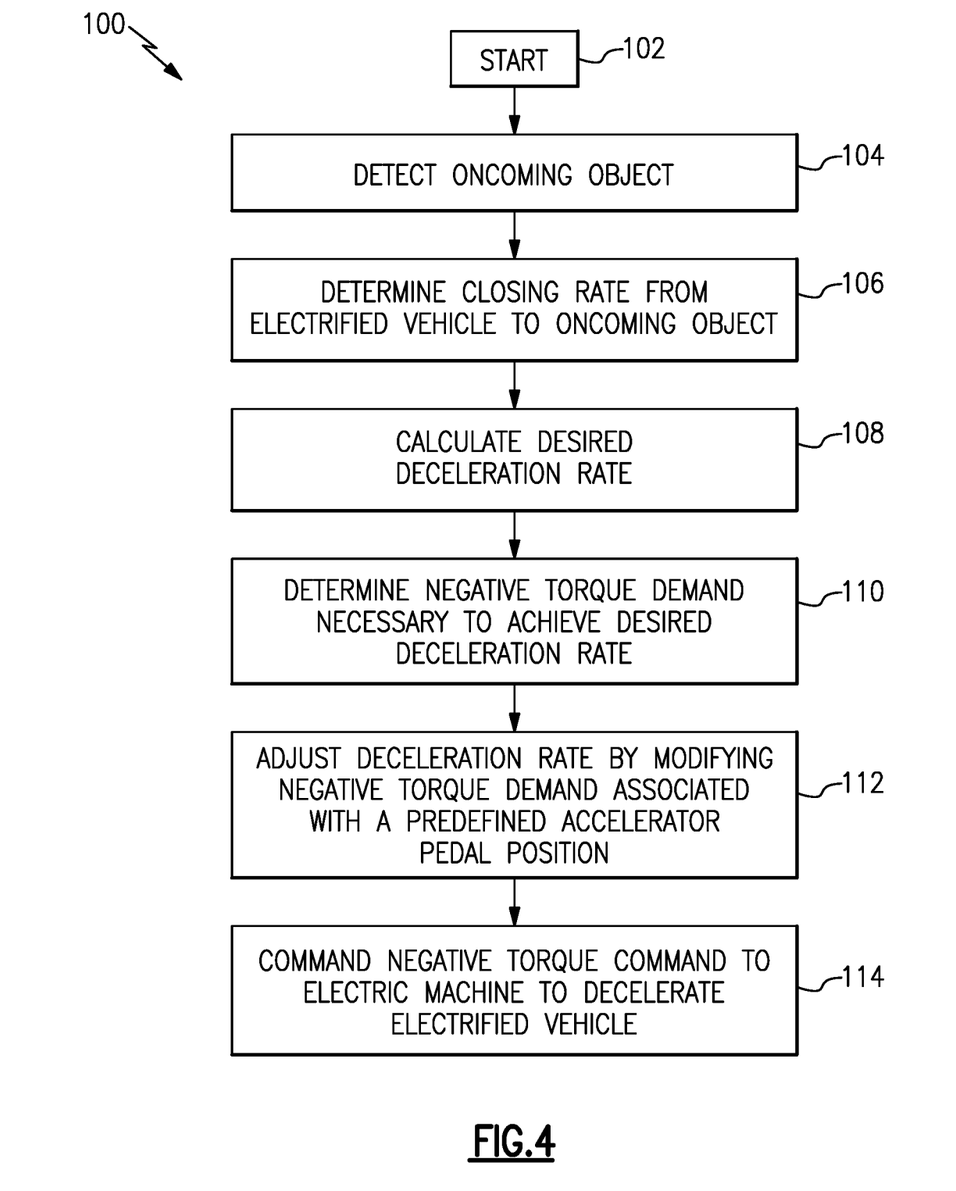
FIG. 4 schematically illustrates a vehicle control strategy for adjusting a deceleration rate of an electrified vehicle based on its closing rate to an oncoming object.

FIG. 4, with continued reference to FIGS. 1-3, schematically illustrates a vehicle control strategy 100 of an electrified vehicle 12 equipped with the vehicle system 56 described above. The exemplary vehicle control strategy 100 may be performed to adjust a deceleration rate of the electrified vehicle 12 during certain driving events. For example, the deceleration rate of the electrified vehicle 12 can be adjusted based on a closing rate of the electrified vehicle 12 to an oncoming object 76. Of course, the vehicle system 56 is capable of implementing and executing other control strategies within the scope of this disclosure. In one embodiment, the control module 60 of the vehicle system 56 may be programmed with one or more algorithms adapted to execute the vehicle control strategy 100, or any other control strategy. In other words, in one non-limiting embodiment, the vehicle control strategy 100 may be stored as executable instructions in the non-transitory memory 74 of the control module 60.

As shown in FIG. 4, the vehicle control strategy 100 begins at block 102. At block 104, an oncoming object 76, such as another vehicle, a stop sign or a stop light ahead of the electrified vehicle 12, is detected by the object detection subsystem 58 of the vehicle system 56. Detection of the oncoming object 76 indicates that the electrified vehicle 12 must begin to decelerate. The closing rate signal S2 may be communicated to the control module 60 if an oncoming object 76 is detected (see FIG. 2).

If an oncoming object 76 has been detected, the vehicle control strategy 100 determines a closing rate of the electrified vehicle 12 to the oncoming object 76 at block 106. The control module 60 of the vehicle system 56 may determine the closing rate based on a distance D to the oncoming object 76 and a closing velocity to the oncoming object 76 (see FIG. 3). The closing velocity may be calculated based on both a velocity V1 of the electrified vehicle 12 as well as a velocity V2 of the oncoming object 76, if any.

A desired deceleration rate of the electrified vehicle 12 can be calculated at block 108. In one embodiment, the desired deceleration rate is based at least on the closing rate obtained at block 106. For example, if the closing rate is calculated as 2 MPH/second, then the desired deceleration rate is approximately 2 MPH/second.

Once the desired deceleration rate is known, a negative torque demand necessary to achieve the desired deceleration rate can be determined at block 110. The negative torque demand that is required to decelerate the electrified vehicle 12 may be correlated to the desired deceleration rate. For example, in one non-limiting embodiment, the negative torque demand can be obtained from a look-up table stored on the control module 60 that lists deceleration rates and negative torque demand rates required to achieve such deceleration rates.

Next, at block 112, the deceleration rate of the electrified vehicle 12 may be adjusted to achieve a smooth, linear deceleration to the oncoming object 76. In one embodiment, the deceleration rate of the electrified vehicle 12 is adjusted by modifying the negative torque demand that is associated with a predefined accelerator pedal position. In one embodiment, the predefined accelerator pedal position is set at a 5% pedal position. In another embodiment, the predefined accelerator pedal position is set at a 0% pedal position. In yet another embodiment, the predefined accelerator pedal position is set between a 0% pedal position and a 5% pedal position. In yet another embodiment, the predefined accelerator pedal position is between a 0% pedal position and a pedal position that corresponds to zero torque demand (i.e., the point where the accelerator pedal map 78 of FIG. 5 crosses from negative to positive) or that corresponds to zero acceleration. The negative torque assigned to the predefined pedal position may be modified to be equal to the negative torque demand obtained at block 110 in order to achieve the desired deceleration rate to the detected oncoming object 76.

Figure 5:
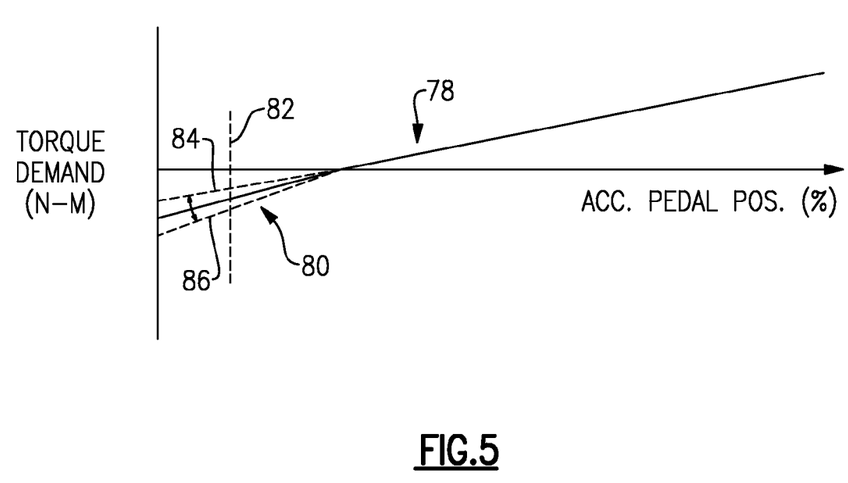
FIG. 5 illustrates an accelerator pedal map.

The deceleration rate adjustment that occurs at block 112 of FIG. 4 may be illustrated and described with reference to an accelerator pedal map 78 of FIG. 5. The accelerator pedal map 78 plots torque demand (in N-m or lb-ft) versus accelerator pedal position (in %). In one embodiment, the deceleration rate is adjusted by increasing or decreasing a negative torque demand 80 of the accelerator pedal map 78 at a predefined accelerator pedal position 82. The negative torque demand 80 may be raised to position 84 if lower deceleration is needed to stop the electrified vehicle 12 by the time it reaches the oncoming object 76, or may be lowered to position 86 if higher deceleration is needed to stop the electrified vehicle 12 by the time it reaches the oncoming object 76.

By way of a non-limiting example, if the oncoming object 76 is relatively "far," and it is determined at block 108 that a 0.2 MPH/second deceleration rate is needed to achieve linear deceleration, then the negative torque demand 80 associated with the predefined accelerator pedal position 82 is adjusted so that the predefined accelerator pedal position 82 achieves the desired 0.2 MPH/second deceleration rate. Alternatively, if the oncoming object 76 is relatively "close," and it is determined at block 108 that a 2 MPH/second deceleration rate is needed to achieve linear deceleration, then the negative torque demand 80 is adjusted so that the predefined accelerator pedal position 82 achieves the desired 2 MPH/second deceleration rate.

Finally, referring again to FIG. 4, the control module 60 can command the necessary negative torque demand (via torque demand signal S3) to the electric machine 59 to achieve the desired deceleration rate of the electrified vehicle 12 for any given driving event at block 114. In other words, the negative torque demand may be applied to the electric machine 59. The negative torque is transmitted to the vehicle drive wheels 28 to slow the electrified vehicle 12 using regenerative braking. The vehicle control strategy 100 may be performed to control vehicle deceleration based on a positioning of the accelerator pedal 54 and without the need to apply the brakes of the electrified vehicle 12.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling an electrified vehicle by adjusting a deceleration rate based on a closing rate of the electrified vehicle to an oncoming object, wherein adjusting the deceleration rate includes modifying a negative portion of an accelerator pedal map.

2. The method as recited in claim 1, wherein the closing rate is based on a distance and a closing velocity from the electrified vehicle to the oncoming object.

3. The method as recited in claim 2, wherein the closing velocity is based on a first velocity of the electrified vehicle and a second velocity of the oncoming object.

4. The method as recited in claim 1, wherein the controlling step includes:
detecting the oncoming object; and
determining the closing rate to the oncoming object.

5. The method as recited in claim 1, comprising calculating a desired deceleration rate from the closing rate.

6. The method as recited in claim 5, comprising determining a negative torque demand necessary to achieve the desired deceleration rate.

7. The method as recited in claim 6, comprising modifying a torque demand associated with a predefined accelerator pedal position to be equal to the negative torque demand that is necessary to achieve the desired deceleration rate.

8. The method as recited in claim 7, comprising applying the negative torque demand to an electric machine to decelerate the electrified vehicle at the desired deceleration rate.

9. The method as recited in claim 1, wherein the controlling step includes:
correlating a desired deceleration rate to a negative torque demand; and applying the negative torque demand to an electric machine of the electrified vehicle to decelerate the electrified vehicle using regenerative braking.

10. The method as recited in claim 1, wherein the controlling step includes adjusting the deceleration rate without applying brakes of the electrified vehicle.

11. A method, comprising:
determining a desired deceleration rate of an electrified vehicle to an oncoming object; and
modifying a negative torque demand associated with a predefined accelerator pedal position to achieve the desired deceleration rate to the oncoming object.

12. The method as recited in claim 11, comprising applying the negative torque demand to an electric machine of the electrified vehicle to decelerate the vehicle using regenerative braking.

13. The method as recited in claim 11, comprising detecting the oncoming object prior to the determining step.

14. The method as recited in claim 11, wherein the modifying step includes:
changing the negative torque demand on an accelerator pedal map to less negative for a predefined accelerator pedal position if the oncoming object is a first distance from the electrified vehicle;
changing the negative torque demand of the accelerator pedal map to more negative for the predefined accelerator pedal position if the oncoming object is a second distance from the electrified vehicle.

15. A method, comprising:
determining a desired deceleration rate of an electrified vehicle to an oncoming object; and
modifying a negative torque demand associated with a predefined accelerator pedal position to achieve the desired deceleration rate to the oncoming object, wherein the predefined accelerator pedal position is between a 0% pedal position and a pedal position that corresponds to zero torque demand or zero acceleration.

16. A vehicle system, comprising:
an accelerator pedal; and
a control module in communication with said accelerator pedal and configured to modify a deceleration rate of a vehicle by adjusting a negative torque demand associated with a predefined position of said accelerator pedal, wherein adjusting the negative torque demand includes raising or lowering said negative torque demand on an accelerator pedal map stored on said control module.

17. The vehicle system as recited in claim 16, comprising an object detection subsystem that detects an oncoming object ahead of said vehicle.

18. The vehicle system as recited in claim 16, wherein said accelerator pedal includes a sensor that detects a position of said accelerator pedal.

19. The vehicle system as recited in claim 16, comprising an electric machine, wherein said control module commands application of said negative torque demand to said electric machine to decelerate said vehicle.

20. The vehicle system as recited in claim 16, wherein said deceleration rate is based on a closing rate to an oncoming object.

21. A method, comprising:
during a lift pedal event of an electrified vehicle:
raising a negative torque demand associated with a predefined accelerator pedal position on an accelerator pedal map in response to a first deceleration rate of the electrified vehicle relative to an oncoming object; and
lowering the negative torque demand on the accelerator pedal map in response to a second, greater deceleration rate of the electrified vehicle relative to the oncoming object.

22. The method as recited in claim 1, comprising selectively applying a negative torque demand to an electric machine of the electrified vehicle to decelerate the vehicle at the adjusted acceleration rate.

\* \* \* \* \*